US007461895B2

(12) United States Patent
Holdampf et al.

(10) Patent No.: US 7,461,895 B2
(45) Date of Patent: Dec. 9, 2008

(54) ADJUSTABLE SEAT CUSHION BOLSTER MECHANISM

(75) Inventors: Carl J. Holdampf, Farmington Hills, MI (US); Arnold James Wickham, Brighton, MI (US); Christopher Scott Welch, Pontiac, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 0 days.

(21) Appl. No.: 11/659,590

(22) PCT Filed: Aug. 11, 2005

(86) PCT No.: PCT/CA2005/001234

§ 371 (c)(1),
(2), (4) Date: Feb. 7, 2007

(87) PCT Pub. No.: WO2006/015486

PCT Pub. Date: Feb. 16, 2006

(65) Prior Publication Data

US 2008/0036258 A1 Feb. 14, 2008

Related U.S. Application Data

(60) Provisional application No. 60/601,091, filed on Aug. 12, 2004.

(51) Int. Cl.
*B60N 2/20* (2006.01)
(52) U.S. Cl. ............................. 297/284.9; 297/378.12
(58) Field of Classification Search ............. 297/284.1, 297/284.4, 284.9, 378.12
See application file for complete search history.

(56) References Cited

U.S. PATENT DOCUMENTS

| 3,550,953 | A | * | 12/1970 | Neale | 297/312 |
| 4,353,595 | A | * | 10/1982 | Kaneko et al. | 297/408 |
| 4,636,000 | A | * | 1/1987 | Nishino | 297/284.9 |
| 4,938,529 | A | * | 7/1990 | Fourrey | 297/284.9 |
| 5,087,098 | A | * | 2/1992 | Ishizuka | 297/284.4 |
| 5,286,087 | A | * | 2/1994 | Elton | 297/284.8 |

(Continued)

FOREIGN PATENT DOCUMENTS

WO    WO 2005/023583 A1    3/2005

OTHER PUBLICATIONS

International Search Report & Written Opinion for PCT/CA2005/001234 Dated Dec. 12, 2005.

*Primary Examiner*—Peter R. Brown
(74) *Attorney, Agent, or Firm*—Clark Hill PLC

(57) ABSTRACT

A seat frame assembly is provided for compactly folding a motor vehicle seat. The seat frame assembly includes at least one side frame member. An actuator is operatively coupled to the side frame member. An elongated control arm includes a first end pivotally coupled to the side frame member and an opposite distal end. A control link includes one end pivotally coupled to the side frame member and an opposing end operatively coupled to the distal end of the control arm. A seat cushion linkage assembly is operably coupled between one of the control arm and control link and the actuator for moving each of the control arm and control link between a stowed position generally parallel with and adjacent to the side frame member and a support position spaced from the side frame member in response to actuation of the actuator.

12 Claims, 11 Drawing Sheets

U.S. PATENT DOCUMENTS

| | | | |
|---|---|---|---|
| 5,664,841 A * | 9/1997 | Dal Monte | 297/284.4 |
| 6,068,336 A | 5/2000 | Schonauer | |
| 6,578,916 B2 | 6/2003 | Longhi et al. | |
| 6,672,666 B2 | 1/2004 | Stiller et al. | |
| 6,679,557 B2 | 1/2004 | Craft et al. | |
| 7,131,697 B2 * | 11/2006 | Beermann et al. | 297/354.12 |
| 2004/0140705 A1 * | 7/2004 | McMillen et al. | 297/378.1 |

* cited by examiner

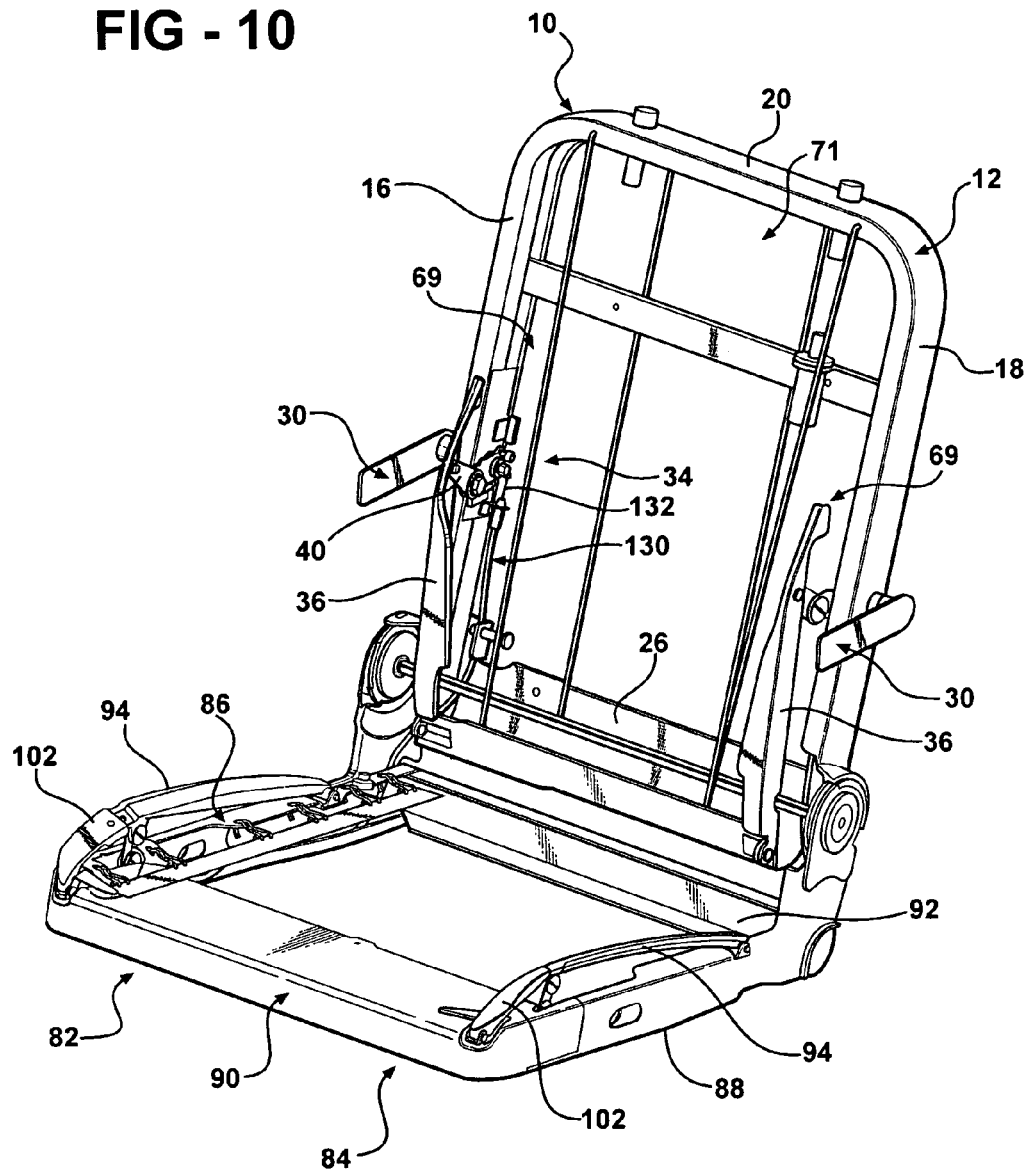

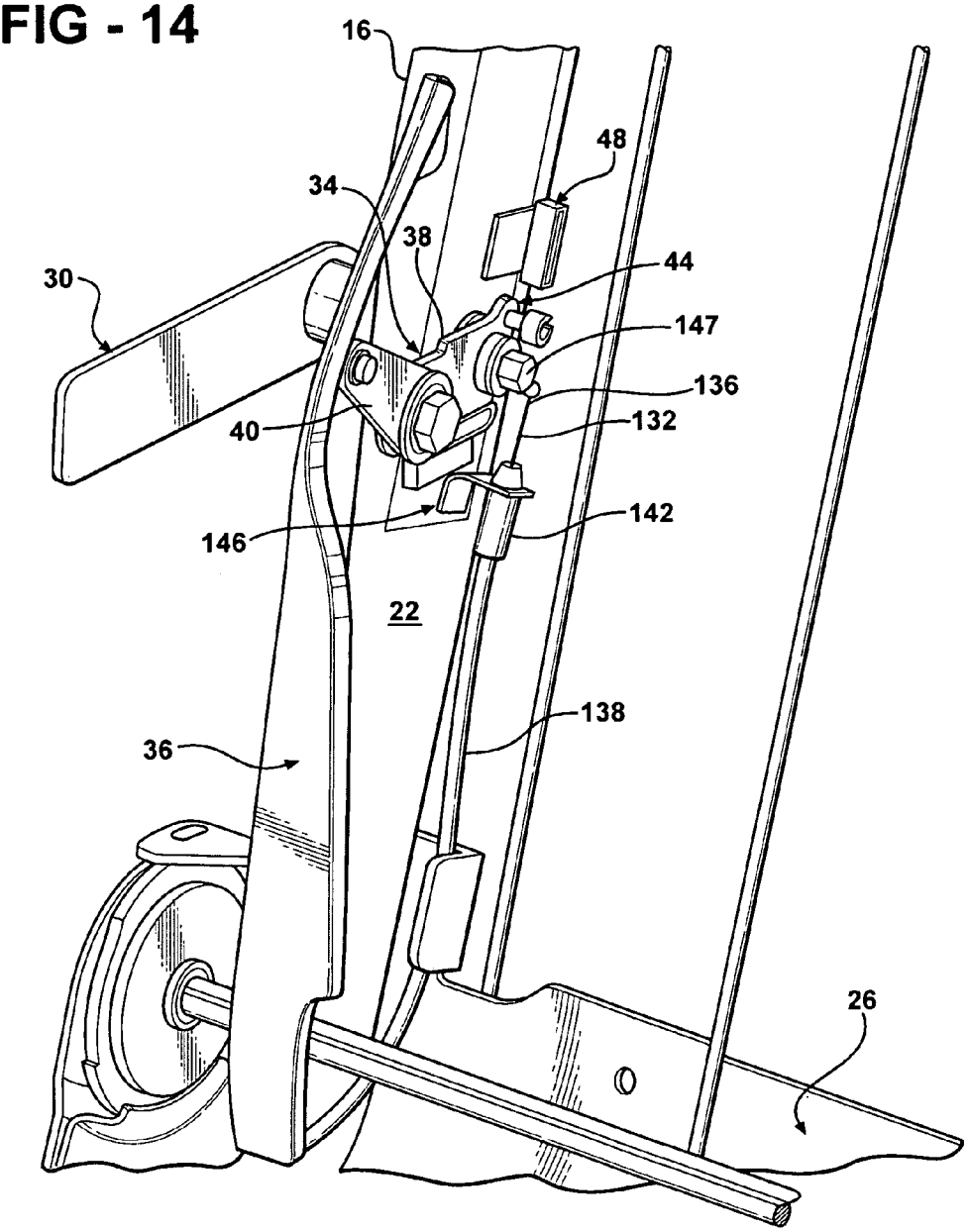

ADJUSTABLE SEAT CUSHION BOLSTER MECHANISM

FIELD OF THE INVENTION

This invention relates to a seat frame assembly for a motor vehicle seat. More particularly, the invention relates to a seat frame assembly including adjustable side bolsters that allow for compact folding of a motor vehicle seat.

DESCRIPTION OF RELATED ART

A motor vehicle includes one or more seat assemblies for supporting occupants within a passenger compartment. The seat assembly typically includes a seat cushion and a seat back pivotally secured to the seat cushion. The seat back is generally movable between an upright seating position and a stowed position, in which the seat back is folded against the seat cushion. When the seat back is in its stowed position, additional storage space is created within the passenger compartment above the folded seat back.

The seat cushion and the seat back each include side bolsters or side support structures for supporting a seat occupant. Such side bolsters are particularly useful in supporting the seat occupant during lateral accelerations of the motor vehicle. The side bolsters present, however, a problem during folding of the seat back into its stowed position. Specifically, the side bolsters along the seat cushion and/or seat back prevent the seat back and the seat cushion from folding completely flat against one another. As a result, an amount of space within the passenger compartment that would ideally be used for storage is instead occupied by the seat assembly.

Thus, it would be desirable to provide an adjustable side bolster that allows a seat back and a seat cushion to fold completely flat against one another in order to maximize storage space within a motor vehicle passenger compartment.

SUMMARY OF THE INVENTION

According to one aspect of the invention, a seat frame assembly is provided for compactly folding a motor vehicle seat. The seat frame assembly includes at least one side frame member. An actuator is operatively coupled to the side frame member. An elongated control arm includes a first end pivotally coupled to the side frame member and an opposing distal end. A control link has one end pivotally coupled to the side frame member and an opposing end operatively coupled to the distal end of control arm. A seat cushion linkage assembly is coupled between one of the control arm and the control link and the actuator for moving the control arm and control link between a stowed position generally parallel and adjacent to the side frame member and a support position spaced from the side frame member in response to actuation of the actuator.

According to another aspect of the invention, a motor vehicle seat includes a seat cushion having at least one side frame member. A first control arm is pivotally coupled to the side frame member of the seat cushion for movement between a support position and a stowed position. A seat back is pivotally coupled to the seat cushion and has at least one side frame member. A second control arm is pivotally coupled to the side frame member of the seat back for movement between a support position and a stowed position. An actuator is operably coupled to the first control arm for moving the first control arm between the support and stowed positions. A cable assembly is operably connected between the first control arm and the second control arm for urging the second control arm between the support and stowed positions as the actuator moves the first control arm between the respective support and stowed positions to selectively allow compact folding of the seat back against the seat cushion.

According to yet another aspect of the invention, a method of adjusting the shape of a side bolster portion, having a control arm movable between a support position and a stowed position, independent of a center seating portion of a seat includes the steps of: defining the side bolster portion independent of the center seating portion; actuating the control arm between the stowed position and the support position; and altering the shape of the side bolster portion relative to the shape of the center seating portion in response to actuation of the control arm between the stowed and support positions.

BRIEF DESCRIPTION OF THE DRAWINGS

Advantages of the invention will be readily appreciated as the same becomes better understood by reference to the following detailed description when considered in connection with the accompanying drawings wherein:

FIG. 10 is a perspective view of a seat in a second embodiment of the invention including a seat frame assembly including an armrest in a use position, and an elongated control arm and control link in a support position;

FIG. 14 is a fragmentary, perspective view of a seat back including the armrest in the use position and the control arm in the support position.

DETAILED DESCRIPTION OF THE PREFERRED EMBODIMENTS

Figure 1:
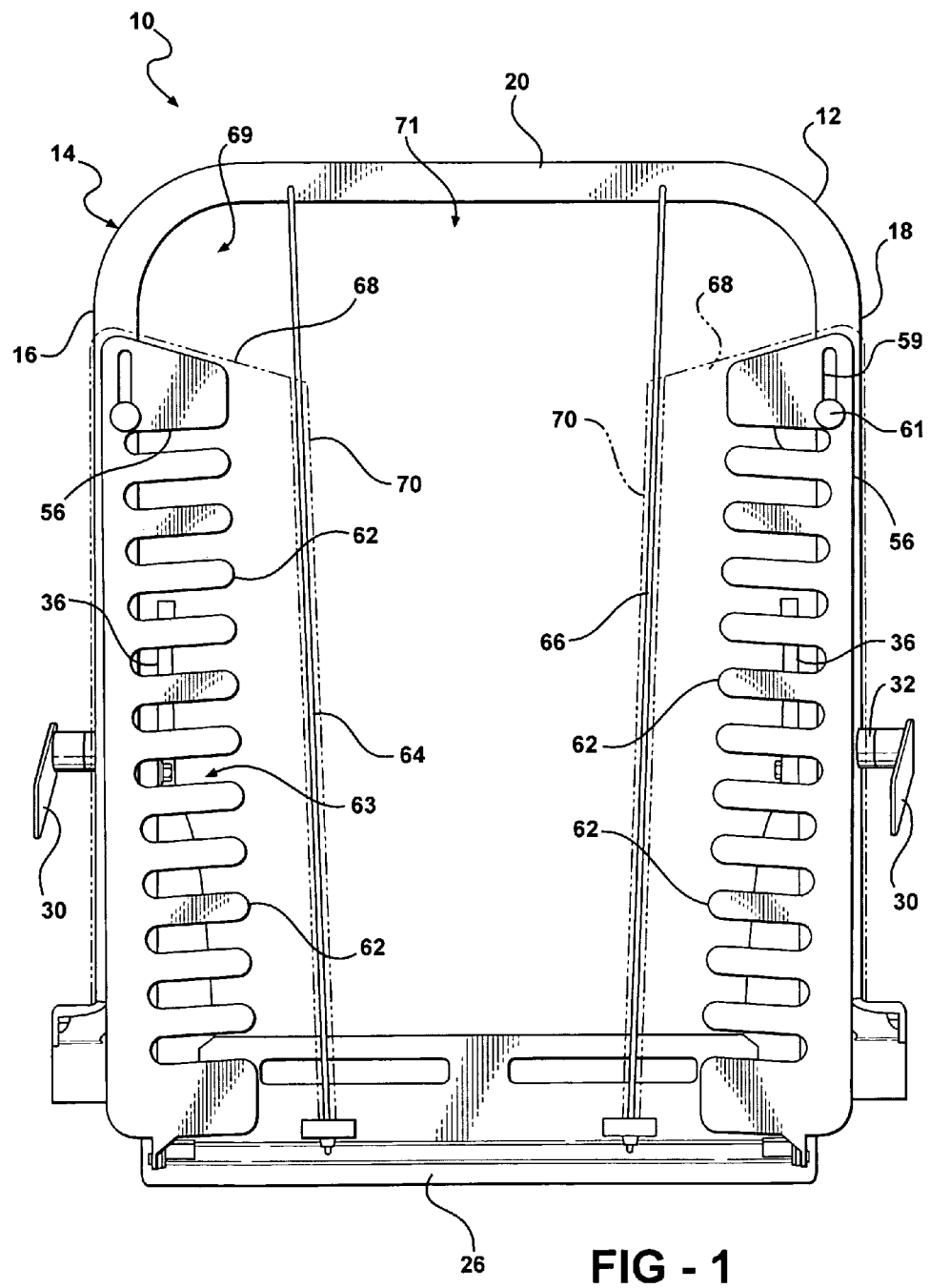
FIG. 1 is a front view of a seat frame assembly according to the invention.

Referring to FIG. 1, according to a first embodiment of the invention, a seat, generally shown at 10, includes a seat back 12 having a seat frame assembly, generally indicated at 14, for supporting a foam pad (not shown) encased in a trim cover (not shown). It will be appreciated that although the seat frame assembly 14 for the seat back 12 is shown, the same general construction of the seat frame assembly 14 may be utilized for a seat cushion (not shown).

The seat frame assembly 14 includes side frame members 16, 18 and an upper cross member 20 extending between the side frame members 16, 18. The side frame members 16, 18 are generally parallel and define a vertical plane therebetween. The seat frame assembly 14 also includes a lower cross member 26 extending between the side frame members 16, 18. The lower cross member 26 is spaced apart from and parallel to the upper cross member 20.

Referring to FIGS. 1 through 4, an actuator 30 is pivotally secured to each of the side frame members 16, 18. In the embodiment shown, the actuator is an armrest 30. The armrest 30 pivots about a pivot pin 32 between a use position, shown in FIGS. 1 and 2, for supporting an arm of the seat occupant, and a retracted position, shown in FIG. 9, generally co-planar with the side frame members 16, 18. The pivot pin 32 interconnects the armrest 30 with one of the side frame members 16, 18. When the armrest 30 is in the retracted position, it is disposed along an outboard surface 24 of one of the side frame members 16, 18.

Figure 2:
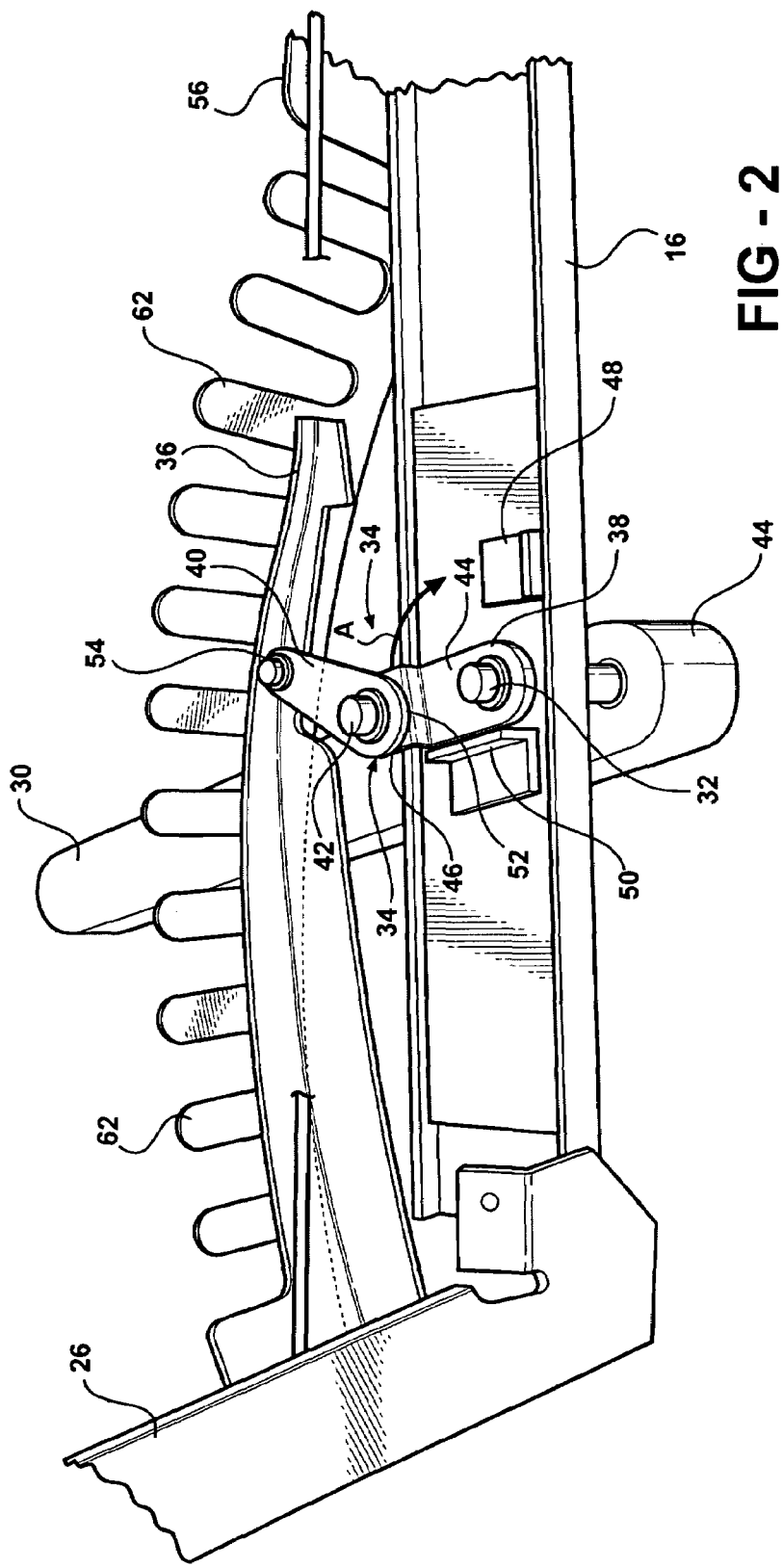
FIG. 2 is a fragmentary, perspective view of the seat frame assembly including an armrest in a use position.
Figure 3:
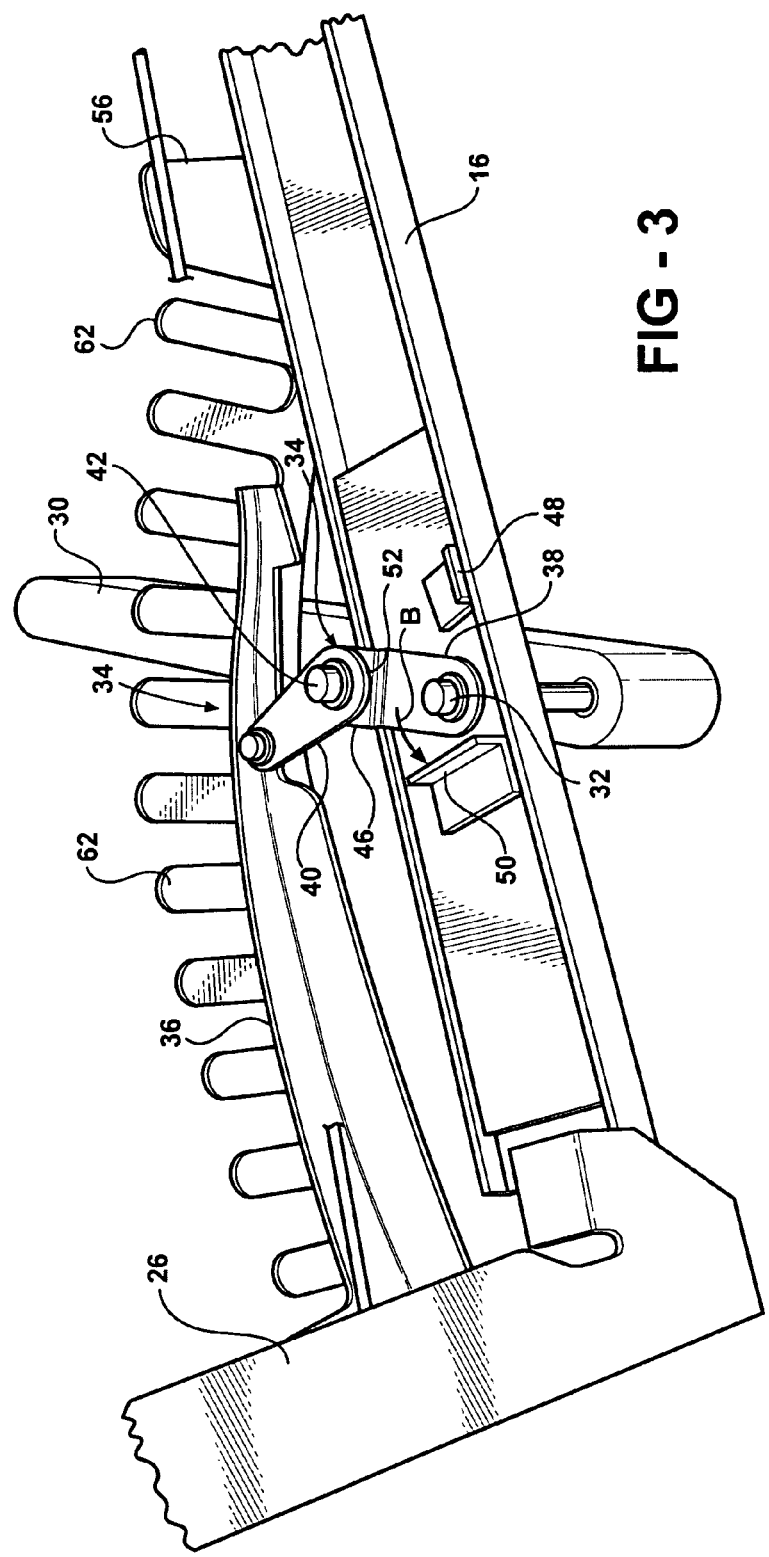
FIG. 3 is a fragmentary, perspective view of the seat frame assembly depicting the armrest moved out of the use position.
Figure 4:
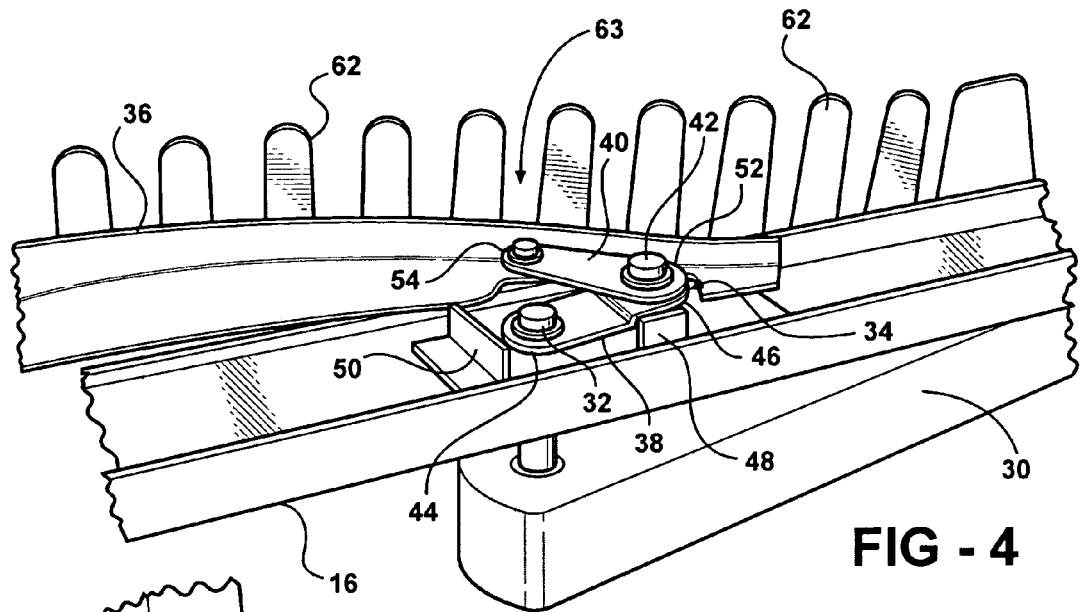
FIG. 4 is a fragmentary, perspective view of the seat frame assembly including the armrest in the retracted position.

Referring now to FIGS. 2 through 4, a linkage assembly, generally indicated at 34, extends between the pivot pin 32 along one of the side frame members 16, 18 and an adjustable control arm 36. The attachment of the linkage assembly 34 to the pivot pin 32 results in the linkage assembly 34 being operably connected to the armrest 30. While in a preferred aspect, the actuator 30 has been described above as being an armrest, it is contemplated that the actuator 30 may be any device or mechanism that could be utilized to effect movement of the control arm 36.

The linkage assembly 34 includes a first link member 38 and a second link member 40, which are pivotally secured to one another by a link pin 42. A distal end 44 of the first link member 38 is fixedly secured to the pivot pin 32 such that movement of the armrest 30 pivots the first link member 38 relative to one of the side frame members 16, 18. A proximal end 46 of the first link member 38 is pivotally secured to a proximal end 52 of the second link member 40.

Each of the side frame members 16, 18 includes an upper 48 and a lower 50 stop located therealong for limiting pivotal movement of the first link member 38. More specifically, the upper stop 48 limits pivotal movement of the first link member 38 towards the upper cross member 20 (as is caused by movement of the armrest 30 into its retracted position). The lower stop 50 limits movement of the first link member 38 towards the lower cross member 26 (as is caused by movement of the armrest 30 into its use position). The upper 48 and lower 50 stops are fixedly secured to the side frame members 16, 18 by welding or like methods.

The second link member 40 includes a distal end 54 pivotally and fixedly secured to the control arm 36. Movement of the armrest 30 between the use and retracted positions, as is shown in FIGS. 2 through 4, causes the second link member 40 of the linkage assembly 34 to pivot in an opposite direction relative to the first link member 38. Because the control arm 36 is fixedly secured to the second link member 40, pivotal movement of the second link member 40 urges movement of the control arm 36 relative to one of the side frame members 16, 18.

Figure 5:
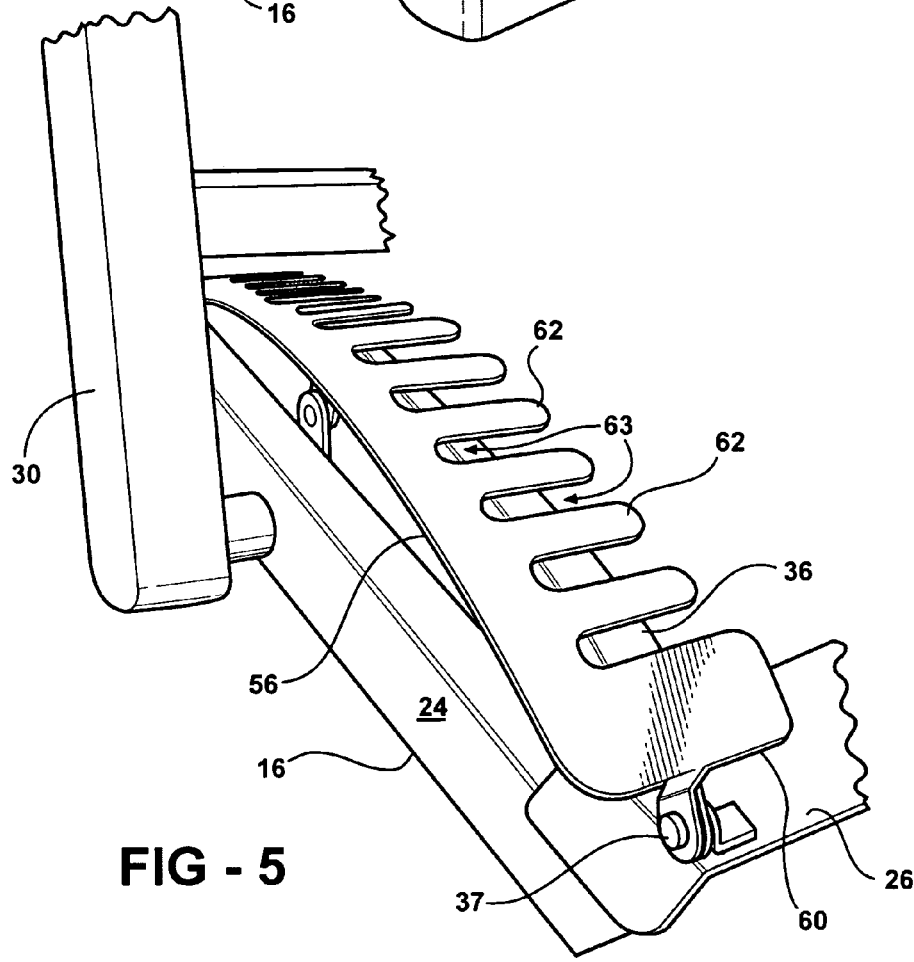
FIG. 5 is a fragmentary, perspective view of the pivotal attachment of a control arm and a plate to a lower cross member.

Referring to FIG. 5, the control arm 36 is also pivotally secured to the lower cross member 26 about a pivot pin 37 for movement towards and away from the vertical plane of the side frame members 16, 18. Specifically, the control arm 36 is movable between a support position, shown in FIGS. 5 and 8, and a stowage position, shown in FIG. 9. In the support position, the control arm 36 extends away from the side frame members 16, 18 so as to be spaced apart therefrom. In the stowage position, the control arm 36 is generally co-planar with the side frame members 16, 18, and is disposed along an inboard surface 22 of one of the side frame members 16, 18.

The control arm 36 provides lateral support for the seat occupant. Although the control arm 36 is shown as having a slight curvature, it is appreciated that the particular shape of the control arm 36 may vary depending on design preferences.

Figures 6, 7:
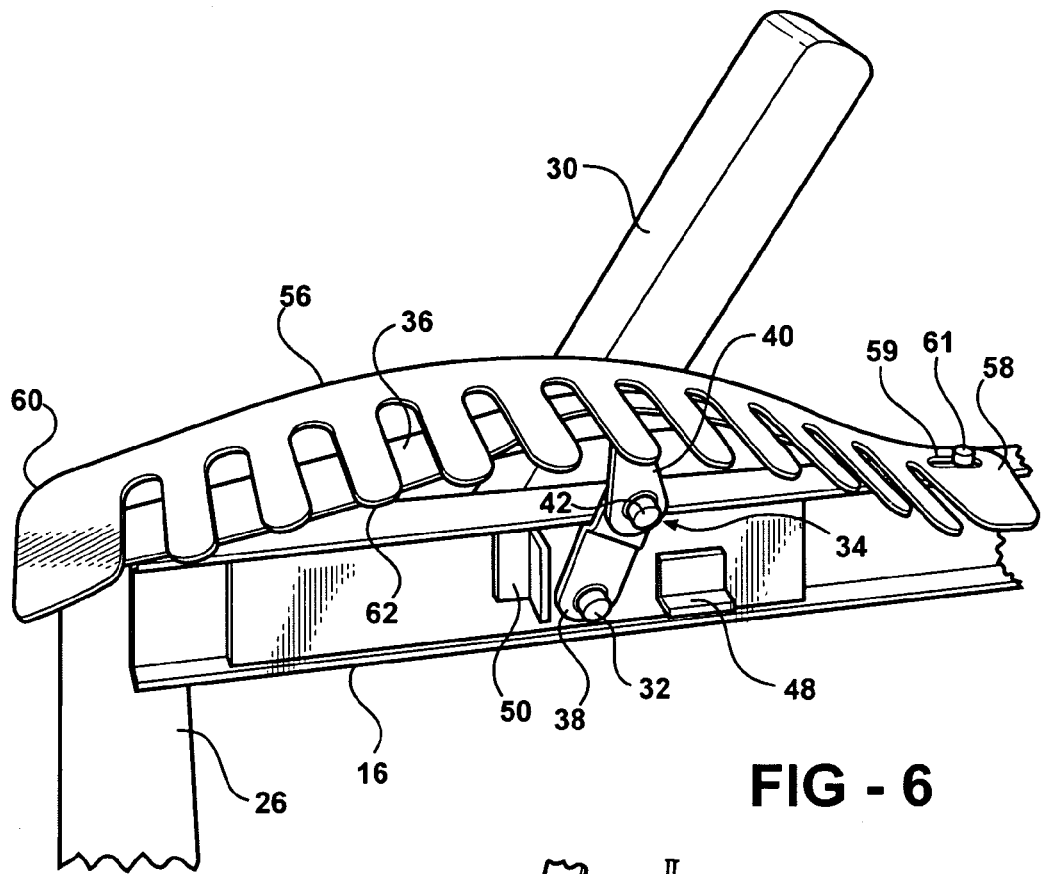
FIG. 6 is a fragmentary, side perspective view of the seat frame assembly including the control arm in a support position.
FIG. 7 is a fragmentary, perspective view of a bag encasing the plate.

Referring now to FIGS. 5 and 6, a plate 56 overlies the control arm 36 and extends between an upper end 58 and a lower end 60. The upper end 58 of the plate 56 includes a slot 59 slidably receiving a connection pin 61 therein to fixedly secure the upper end 58 of the plate 56 to one of the side frame members 16, 18. The lower end 60 is pivotally secured to the lower cross member 26 about the pivot pin 37. Thus, the plate 56 and the control arm 36 both pivot about the pivot pin 37.

The plate 56 is flexible, and may be formed from a lightweight metal, a molded plastic material, or any other suitable material. The plate 56 defines a plurality of lateral fingers 62 extending between the upper 58 and lower 60 ends. An opening 63 is formed between each of the plurality of lateral fingers 62. The formation of the plurality of lateral fingers 62, along with the corresponding openings 63, provides the plate 56 with greater flexibility than a continuous plate without openings.

Figure 9:
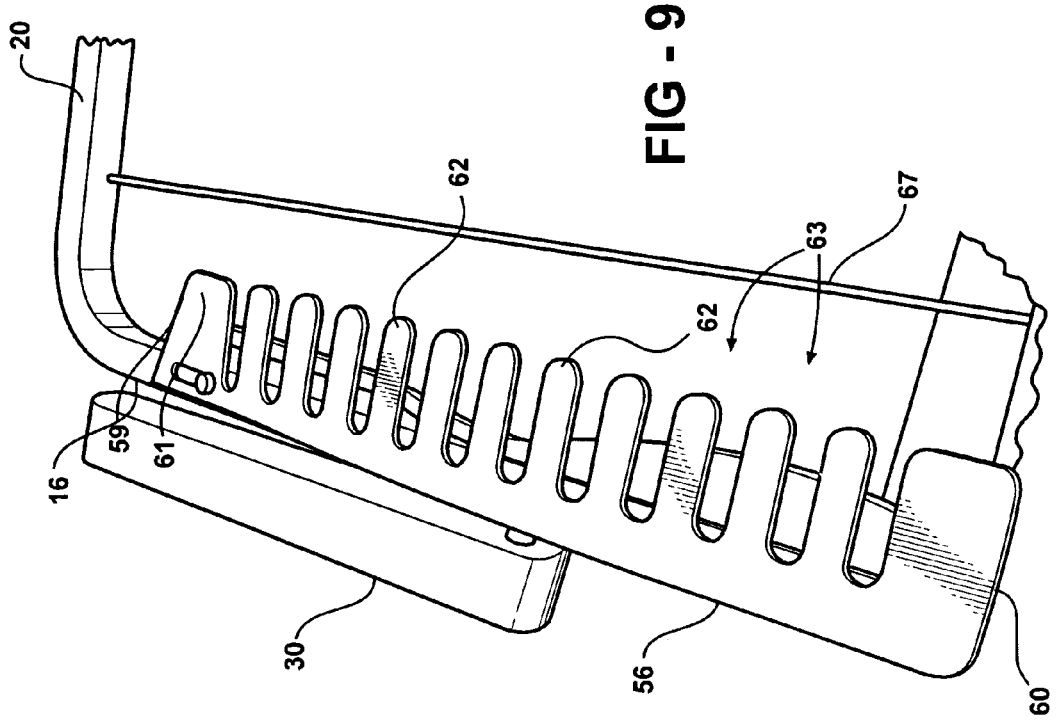
FIG. 9 is a fragmentary, perspective view of the seat frame assembly including the armrest in the retracted position and the control arm in a stowed position.
Figure 8:
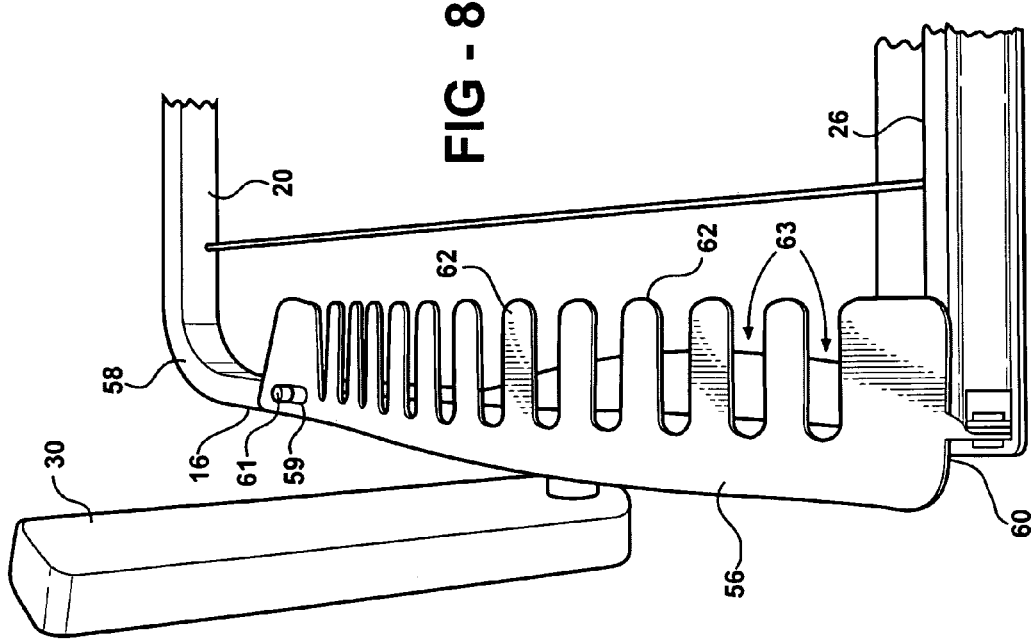
FIG. 8 is a fragmentary, perspective view of the seat frame assembly including the armrest in the use position and the control arm in the support position.

When the control arm 36 is in the support position, as shown in FIGS. 5 and 8, the control arm 36 presses the plate 56 away from the side frame members 16, 18; thereby giving the plate 56 a curved shape. The plurality of lateral fingers 62 allows the plate 56 to bend, but not break, in response to such pressing by the control arm 36. When the control arm 36 is in the stowage position, as shown in FIG. 9, the control arm 36 does not exert a force on the plate 56 so that the plate 56 is generally planar.

Referring to FIGS. 1 and 7, a pair of support rods 64, 66 extends between the upper cross member 20 and the lower cross member 26. A mesh bag or wrap 68 encases the plate 56, and extends between the plate 56 and one of the support rods 64, 66 to provide cushioning for the seat occupant and shape the plate 56 and bolster area of the seat assembly 10. The bag 68 includes a sleeve 70 formed at one end for receiving one of the support rods 64, 66 therethrough.

Alternatively, the plate 56 may be formed from a molded plastic material wherein the plurality of lateral fingers 62 extends out to one of the pair of support rods 64, 66 for direct attachment thereto. As a result, the need for the bag or wrap 68 is eliminated.

In operation, starting with the armrest 30 in the use position, as shown in FIG. 8, and the control arm 36 in the support position, the armrest 30 is pivoted relative to the side frame members 16, 18 towards the upper cross member 20. The movement of the armrest 30 pivots the first link member 38 relative to the side frame members 16, 18, as shown in FIGS. 2 through 4. In response, the second link member 40 pivots about the link pin 42 in a direction opposite to that of the first link member 38. The pivoting of the second link member 40 urges the control arm 36 out of its support position. The control arm 36 also pivots about pivot pin 37 towards the side frame members 16, 18. The plate 56 pivots about the pivot pin 37 to allow the plate 56 to have a planar shape for folding of the seat assembly 14. When the first link member 38 abuts the upper stop 48, the armrest 30 has reached its retracted position and is disposed along the outboard surface 24 of one of the side frame members 16, 18. The abutment of the first link member 38 against the upper stop 48 also stops the pivoting of the second link member 40 about the link pin 42. At this time, the control arm 36 has reached its stowed position.

When the control arm 36 is in the stowed position, the side frame members 16, 18, the armrest 30, the control arm 36, and the plate 56 are generally co-planar with one another. As a result, the seat back 12 can be folded flat against the seat cushion for stowage of the seat 10. Ideally, the seat cushion incorporates the seat frame assembly 14 according to the invention to provide a seat that can be compactly folded. Such a folding arrangement maximizes storage space within a motor vehicle passenger compartment.

To move the armrest 30 from the retracted position back to the use position, the armrest 30 is pivoted downwards towards the lower cross member 26. The movement of the armrest 30 urges the first link member 38 to pivot relative to the side frame members 16, 18 towards the lower stop 50 mounted therealong. At the same time, the second link member 40 pivots about the link pin 42 in a direction opposite to that of the first link member 38. The second link member 40 pivots out away from the side frame members 16, 18. At the same time, the control arm 36 pivots about the pivot pin 37 relative to the lower cross member 26 and away from the side frame members 16, 18. The control arm 36 presses the plate 56 to give a curved shape to the plate 56 for forming a side bolster portion or area 69 to support an occupant of a vehicle. The first link member 38 continues to pivot until it abuts the lower stop 50, at which time the armrest 30 has reached its use position. The abutment of the first link member 38 against the lower stop 50 also stops the pivoting of the second link member 40 about the link pin 42. At this time, the control arm 36 has reached its support position. The plate 56 with the lateral flexible fingers 62 provides the desired shaping to the side bolster portion 69 of the seat 10. Additionally, the mesh bag or wrap 68 which extends about the plate 56 to the support rods 64, 66 separates and defines the side bolster portion 69 of the seat 10 from a center seating portion 71 thereof, typically also along a contoured valley in the foam pad and seam line in the trim cover. The mesh bag 68 prevent the adjustment of the side bolster portion 69 by the control arm 36 from affecting the shape and position of the center seating portion 71 of the seat 10. The side bolster 69 and center seating 71 portions may be independently shaped, padded, and trimmed or include a contiguous foam pad and trim cover while maintaining independent shapes.

Referring to FIGS. 10 through 15, according to another embodiment of the invention, the seat 10 includes a seat cushion 82 having a seat cushion frame assembly, generally indicated at 84, for supporting a foam pad (not shown) encased in a trim cover (not shown). The seat cushion frame assembly 84 includes side frame members 86, 88 and a front cross member 90 extending between the side frame members 86, 88. The side frame members 86, 88 are generally parallel and define a horizontal plane therebetween. A rear cross member 92 extends between the side frame members 86, 88. The rear cross member 92 is spaced apart from and parallel to the front cross member 90.

Figure 11:
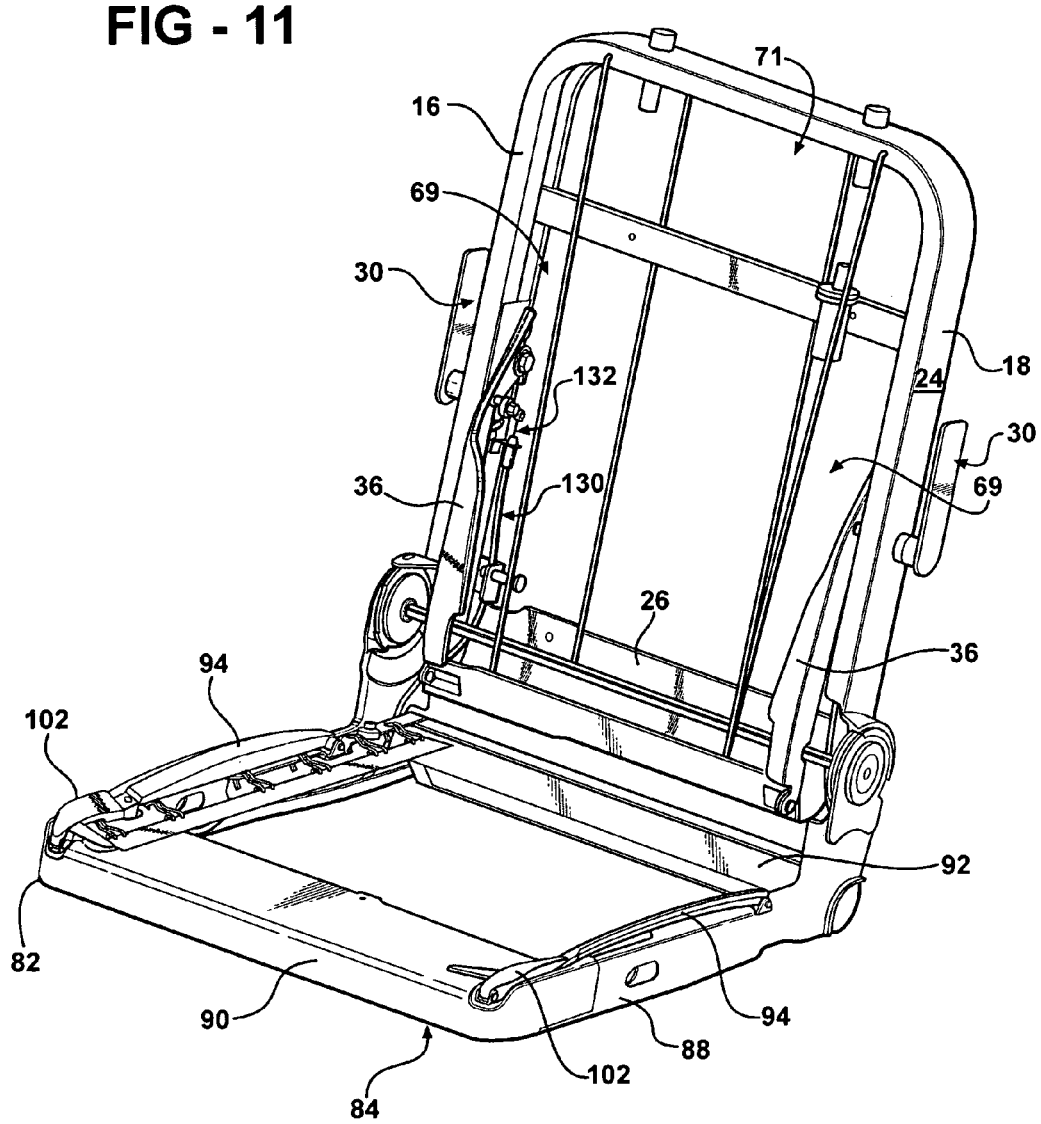
FIG. 11 is a perspective view of the seat including the armrest in a retracted position and the elongated control arm and control link in a stowed position.
Figure 12:
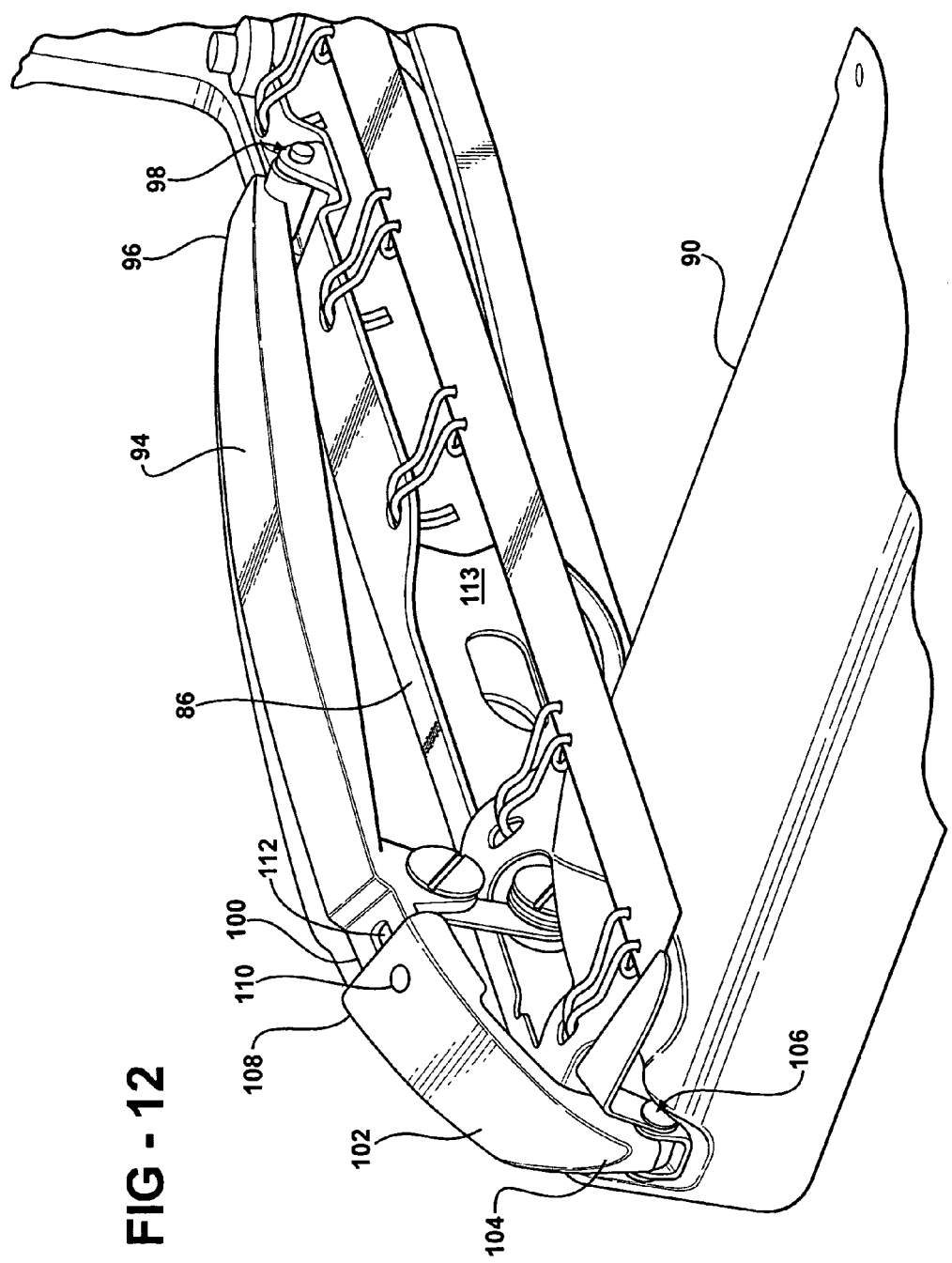
FIG. 12 is a fragmentary, perspective view of a seat cushion including the elongated control arm and control link in the support position.

Referring to FIGS. 10 through 12, the seat cushion frame assembly 84 also includes an elongated control arm 94 similar to the control arm 36 of the seat back 12 in the previous embodiment. The control arm 94 is operatively coupled to each of the side frame members 86, 88 of the seat cushion frame assembly 84. Each control arm 94 includes a first end 96 pivotally secured to the side frame members 86, 88 about a pivot pin 98, and an opposing distal end 100, as shown in FIG. 12.

Referring now to FIG. 12, a control link 102 includes a first end 104 pivotally secured to the front cross member 90 about a pivot pin 106, and an opposing distal end 108 slidably coupled to the distal end 100 of one of the control arms 94. Preferably, the distal end 108 of the control link 102 includes a pin 110 projecting therefrom, and the distal end 100 of the control arm 94 includes a slot 112 for receiving the pin 110 in order to slidably couple the control link 102 to the control arm 94. Although the pin 110 and slot 112 have been set forth for coupling the control link 102 to the control arm 94, it is appreciated that, in the alternative, any type of operative coupling that allows the control arm 94 and the control link 102 to move independently may be used.

Each control arm 94 and control link 102 is movable between a support position, shown in FIG. 10, and a stowed position, shown in FIG. 11. In the support position, the control arm 94 and the control link 102 are spaced apart from the underlying side frame member 86, 88. In the stowed position, the control arm 94 and the control link 102 are disposed along an inboard surface 113 of each side frame member 86, 88 so that the control arm 94 and the control link 102 are generally parallel with and adjacent to each side frame member 86, 88.

The control arm 94 and the control link 102 provide lateral support for the seat occupant. Although the control arm 94 and the control link 102 are shown as having a slight curvature, it is contemplated that the particular shape of the control arm 94 and the control link 102 may vary.

Figure 13:
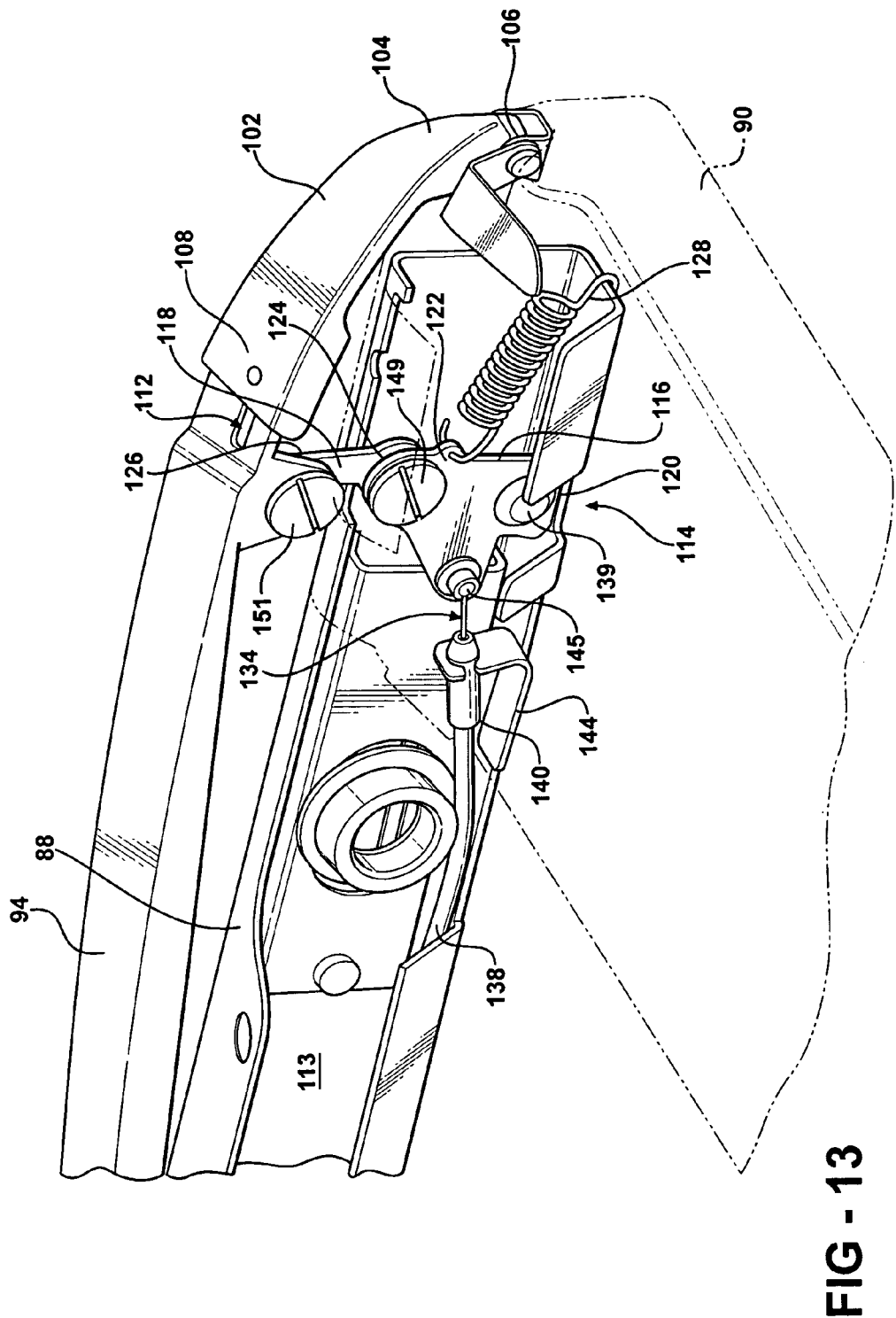
FIG. 13 is a fragmentary, perspective view of the seat cushion including a seat cushion linkage assembly.

Referring to FIG. 13, a seat cushion linkage assembly, generally shown at 114, extends between the control arm 94 and the side frame member 88. It is, however, appreciated that the seat cushion linkage assembly 14 may, in the alternative, extend between the control link 102 and the side frame member 88. The seat cushion linkage assembly 114 includes a first link member 116 and a second link member 118. The first link member 116 includes a distal end 120 pivotally secured to one of the side frame members 86, 88, and an opposite proximal end 122. The second link member 118 includes a proximal end 124 and an opposite distal end 126. The proximal end 122 of the first link member 116 is pivotally secured to the proximal end 124 of the second link member 118, and the distal end 126 of the second link member 118 is pivotally secured to the control arm 94.

The seat cushion linkage assembly 114 also includes a spring 128 coupled between the first link member 116 and the front cross member 90. The spring 128 biases the control arm 94 and control link 102 into the stowed position. When the control arm 94 and the control link 102 are in the support position, the spring 128 is fully extended against the bias thereof.

Referring back to FIGS. 10 and 11, a cable assembly, generally shown at 130, includes a cable 132. The cable 132 includes a first end 134 operatively coupled to the seat cushion linkage assembly 114, as shown in FIG. 13, and a second end 136 operatively coupled to the linkage assembly 34, as shown in FIG. 14. The cable assembly 130 also includes a cable sheath 138 for covering and slidably guiding the cable 132 running therethrough. The cable sheath 138 has a first end 140 and an opposing second end 142.

Referring to FIG. 13, the first end 140 of the cable sheath 138 is fixedly secured along the inside surface 113 of one of the side frame member 86, 88 of the seat cushion 82 by a cable tab 144. The first end 134 of the cable 132 extends out from the first end 140 of the cable sheath 138 and operatively connects to a hub 145 on the first link member 116 of the seat cushion linkage assembly 114.

Referring to FIG. 14, the second end 142 of the cable sheath 138 is fixedly secured along an inside surface 22 of one of the side frame members 16, 18 by a cable tab 146. The second end 136 of the cable 132 extends from the second end 142 of the cable sheath 138 and operatively connects to a hub 147 projecting from the distal end 44 of the first link member 38.

The seat cushion frame assembly 84 may also include the flexible plate 56, set forth in the previous embodiment, overlying the control arm 94 and the control link 102 wherein the flexible plate 56 includes the plurality of spaced apart lateral fingers 62 and is wrapped in the mesh bag 68. The seat cushion frame assembly 84 may further include the pair of support rods 64, 66 extending between the front cross member 90 and the rear cross member 92 to secure one lateral edge of the mesh bag 68 thereto to define the side bolster portion 69 of the seat 10 and separate the side bolster portion 69 from the center seating portion 71. As mentioned above, the mesh bag 68 assists in positioning and shaping the flexible plate 56 as well as separating the side bolster portion 69 from the center seating portion 71 of the seat 10 such that actuation of the control arm 94 and the control link 102, by themselves, effects movement of the side bolster portion 69 of the seat 10.

In operation, starting with the armrest 30 in the use position and the control arm 94 and control link 102 in the support position, as shown in FIG. 10, the armrest 30 is pivoted relative to the side frame members 16, 18 towards the upper cross member 20. The movement of the armrest 30 pivots the first link member 38 relative to the side frame members 16, 18. In response, the second end 136 of the cable 132 moves relative to the side frame members 16, 18, causing the first end 134 of the cable 132 to move relative to the seat cushion side frame members 86, 88. In response to movement of the cable 132, the first link member 116 begins to pivot about a pin 139, shown in FIG. 13, causing the spring 128 to contract. The contraction of the spring 128 urges the first link member 116 to pivot towards the front cross member 90. In response, the second link member 118 pivots about a link pin 149 in a direction opposite to that of the first link member 116, towards the rear cross member 92. The pivoting of the second link member 118 urges each of the control arm 94 and control link 102 out of the support position and towards the stowed position. When the first link member 38 abuts the upper stop 48, the armrest 30 has reached its retracted position and is disposed along the outboard surface 24 of the side frame member 16, 18, as shown in FIG. 11. At this time, the control arm 94 and the control link 102 are in the stowed position.

When the control arm 94 and the control link 102 are in the stowed position, the seat cushion side frame members 86, 88, the control arm 94, and the control link 102 are generally parallel and adjacent with one another. As a result, the seat back 12 can be folded flat against the seat cushion 82 for stowage of the seat 10. Ideally, the seat 10 incorporates the seat frame assembles 14, 84 for the seat back 12 and seat cushion 82, respectively, in order to provide a seat that can be compactly folded. Such a folding arrangement maximizes storage space within a motor vehicle passenger compartment.

To move the armrest 30 from the retracted position back to the use position, the armrest 30 is pivoted downwards towards the lower cross member 26. The movement of the armrest 30 urges the first link member 38 to pivot relative to the side frame members 16, 18 towards the lower stop 50 mounted therealong. In response, the second end 136 of the cable 132 is pulled by the first link member 38 and moves relative to the side frame members 16, 18, and the first end 134 of the cable 132 moves relative to the seat cushion side frame members 86, 88. Movement of the cable 132 causes the first link member 116 to pivot about the pin 139 towards the rear cross member 92, thereby lengthening the spring 128. In response, the second link member 118 pivots about the link pin 149 in a direction opposite to that of the first link member 116, towards the front cross member 90. The pivoting of the second link member 118 causes the control arm 94 and control link 102 to move into the support position, in which the control arm 94 and the flexible plate 56 form the side bolster portion 69. The first link member 38 continues to pivot until it abuts the lower stop 50, at which time the armrest 30 has reached its use position. At this time, the control arm 94 and control link 102 have reached their support position.

According to yet another embodiment of the invention, a method is provided for adjusting the shape of the side bolster portion 69 relative to the center seating portion 71. The side bolster portion 69 is formed by either of the control arms 36, 94 pivotally secured to the respective side frame members 16, 18 and 86, 88 for movement between the stowed position and the support position. The method of adjusting the shape of the side bolster portion relative to the center seating portion 71 includes the steps of: defining the side bolster portion 69 independent of the center seating portion 71; actuating the control arm 36, 94 between the stowed position and the support position; and altering the shape of the side bolster portion 69 relative to the shape of the center seating portion 71 in response to actuation of the control arm 36, 94. The step of altering the shape of the side bolster portion 69 relative to the shape of the center seating portion 71 includes the step of pivoting the control arm 36, 94 towards and away from the respective side frame member 16, 18 and 86, 88.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A seat frame assembly for compactly folding a motor vehicle seat, said seat frame assembly comprising:

at least one side frame member;

an actuator operatively coupled to said side frame member;

an elongated control arm having a first end pivotally coupled to said side frame member and an opposite distal end;

a control link having one end pivotally coupled to said side frame member and an opposing end operatively coupled to said distal end of said control arm;

a seat cushion linkage assembly operably coupled between one of said control arm and control link and said actuator for moving each of said control arm and control link between a stowed position generally parallel with and adjacent to said side frame member and a support position spaced from said side frame member in response to actuation of said actuator, said seat cushion linkage including first and second link members, said first link member having one end pivotally secured to said side frame member and an opposing end pivotally secured to said second link member, said second link member having one end pivotally secured to one of said control arm and control link and an opposing end pivotally secured to said first link member; and a spring extending between said first link member and said side frame member for biasing said control arm and control link into said stowed position.

2. A seat frame assembly as set forth in claim 1 including a flexible plate overlying at least one of said control arm and control link and forming a side bolster of the seat when said control arm and control link are in said support position.

3. A seat frame assembly as set forth in claim 2 wherein said control link includes a pin extending out from said opposing end.

4. A seat frame assembly as set forth in claim 3 wherein said control arm includes a slot formed at said distal end for receiving said pin to slidably couple said control arm to said control link.

5. A seat frame assembly as set forth in claim 4 including a mesh bag encasing said flexible plate to shape said side bolster of the seat.

6. A motor vehicle seat comprising:

a seat cushion having at least one side frame member;

a first control arm pivotally coupled to said side frame member of said seat cushion for movement between a support position and a stowed position;

a seat back pivotally coupled to said seat cushion and having at least one side frame member;

a second control arm pivotally coupled to said side frame member of said seat back for movement between a support position and a stowed position;

an actuator operably coupled to said first control arm for moving said first control arm between said support and stowed positions; and a cable assembly operably connected between said first control arm and said second control arm for urging said second control arm between said support and stowed positions as said actuator moves said first control arm between said respective support and stowed positions to selectively allow compact folding of said seat back against said seat cushion.

7. A motor vehicle seat as set forth in claim 6 including a linkage assembly extending between said side frame member of said seat back and said first control arm for moving said first control arm between said support and stowed positions.

8. A motor vehicle seat as set forth in claim 7 including a control link having one end pivotally coupled to said side frame member of said seat cushion and an opposing end operatively coupled to said second control arm for movement between a support position and a stowed position.

9. A motor vehicle seat as set forth in claim 8 including a seat cushion linkage assembly extending between said side frame member of said seat cushion and one of said second control arm and control link for moving said second control arm and control link between said support and stowed positions.

10. A motor vehicle seat as set forth in claim 9 wherein said cable assembly includes a cable having one end secured to said linkage assembly and an opposing end secured to said seat cushion linkage assembly.

11. A motor vehicle seat as set forth in claim 10 including a cable sheath for housing said cable.

12. A motor vehicle seat as set forth in claim 11 including a cable tab fixedly secured to said side frame member of at least one of said seat cushion and seat back for fixedly retaining one end of said cable sheath.

\* \* \* \* \*